United States Patent
Wimmer

(10) Patent No.: US 6,296,264 B1
(45) Date of Patent: Oct. 2, 2001

(54) SINGLE WHEEL SUSPENSION

(75) Inventor: Hans Wimmer, Neuburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/269,373

(22) PCT Filed: Nov. 3, 1997

(86) PCT No.: PCT/EP97/06049

§ 371 Date: Mar. 25, 1999

§ 102(e) Date: Mar. 25, 1999

(87) PCT Pub. No.: WO98/21058

PCT Pub. Date: May 22, 1998

(30) Foreign Application Priority Data

Nov. 8, 1996 (DE) .................................................. 19646081

(51) Int. Cl.$^7$ .................................................. B60G 9/99
(52) U.S. Cl. .................... 280/124.134; 280/124.135; 280/93.51; 280/93.511; 280/93.512
(58) Field of Search .................. 280/93.502, 93.511, 280/93.51, 93.512, 124.134, 124.135, 124.136

(56) References Cited

U.S. PATENT DOCUMENTS

| | | | |
|---|---|---|---|
| 2,153,083 | 4/1939 | Griswold | 280/124 |
| 3,103,370 | 9/1963 | Krizman | 280/96.1 |
| 3,850,443 | * 11/1974 | Hassan | 280/124.135 |
| 4,753,455 | * 6/1988 | Murakami et al. | 280/124.135 |
| 4,802,688 | 2/1989 | Murakami et al. | 280/666 |
| 4,991,867 | * 2/1991 | Washizu et al. | 280/124.135 |
| 5,048,860 | * 9/1991 | Kanai et al. | 280/124.135 |
| 5,513,874 | * 5/1996 | Mori | 280/124.135 |
| 5,577,758 | * 11/1996 | Csik | 280/673 |
| 5,868,410 | * 2/1999 | Kawabe et al. | 280/124.15 |
| 5,873,587 | * 2/1999 | Kawabe et al. | 280/124.135 |
| 5,975,541 | * 11/1999 | Harara et al. | 280/5.524 |
| 6,027,130 | * 2/2000 | Kawabe et al. | 280/124.135 |
| 6,039,337 | * 3/2000 | Urbach | 280/124.134 |
| 6,113,120 | * 9/2000 | Heap | 280/124.135 |
| 6,123,351 | * 9/2000 | Bruehl | 280/124.135 |

FOREIGN PATENT DOCUMENTS

| | | |
|---|---|---|
| 719 047 | 3/1942 | (DE) . |
| 1 078 881 | 8/1955 | (DE) . |
| 1 630 095 | 4/1971 | (DE) . |
| 113 721 | 8/1974 | (DE) . |
| 41 28 488 A1 | 3/1983 | (DE) . |
| 33 45 952 A1 | 6/1985 | (DE) . |
| 37 18 137 A1 | 12/1988 | (DE) . |
| 37 40 954 A1 | 6/1989 | (DE) . |
| 42 42 708 C1 | 4/1994 | (DE) . |
| 195 25 084 A1 | 8/1996 | (DE) . |
| 2 049 576 | 12/1980 | (GB) . |
| 2 231 540 A | 11/1990 | (GB) . |

* cited by examiner

*Primary Examiner*—Eric Culbreth
*Assistant Examiner*—L. Lum
(74) *Attorney, Agent, or Firm*—Davis & Bujold, P.L.L.C.

(57) ABSTRACT

The invention relates to a suspension for a single wheel of a motor vehicle. A steering knuckle with wheel hub (1) is attached to a steering knuckle carrier (2) by a steering knuckle pin which is connected by a ball and socket joint (3) on its underside to a suspension arm (4) which is secured to the vehicle frame (6) by a pivot bearing (5). A second suspension arm (7) placed above the first suspension arm (4) connects, by means of a pair of tapered roller bearings, the upper part of the steering knuckle carrier (2) to the vehicle frame (6) through a pivot bearing (9).

8 Claims, 1 Drawing Sheet

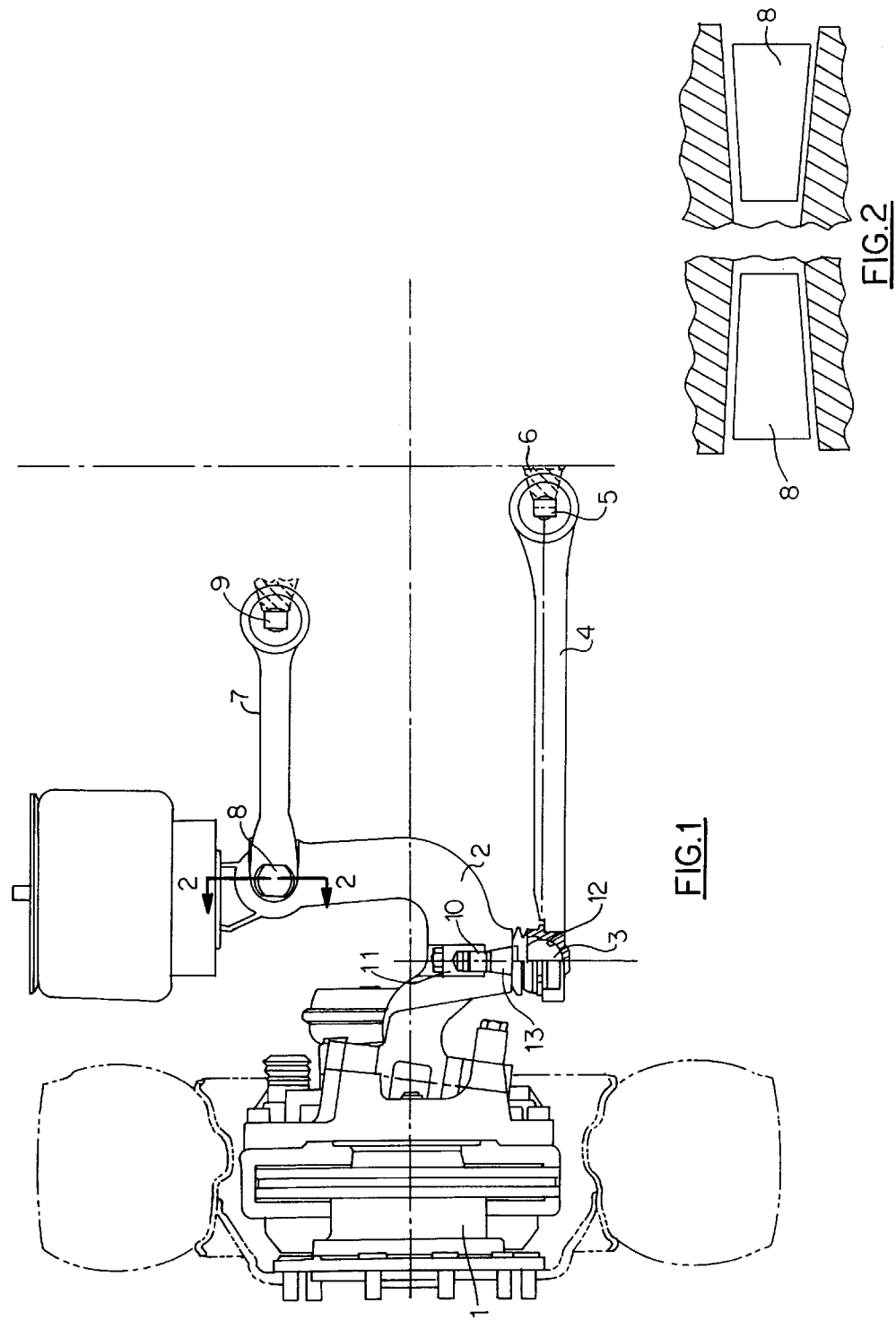

SINGLE WHEEL SUSPENSION

BACKGROUND OF THE INVENTION

The invention relates to a suspension for a single wheel of a motor vehicle. German OS 33 45 952 describes a suspension for a single wheel, with wheel hub, steering knuckle carrier and double suspension arms. The suspension arms are fastened to the steering knuckle carrier by means of a pivot bearing joint. The pivot bearing shaft projects on both sides from the steering knuckle carrier and thus substantially widens it. Such lateral installation of the suspension arms on the steering knuckle carrier limits the wheel lock when steering.

The problem on which the invention is based is to provide a suspension for a single wheel in which the suspension arms are mounted on a steering knuckle carrier so as not to limit the wheel lock.

SUMMARY OF THE INVENTION

The problem is solved by the suspension according to the present invention. A ball and socket joint has here the advantage that, unlike a pivot bearing joint or a modular joint, it is very compact.

According to the present invention, a lower suspension arm is preferably connected on its underside with the steering knuckle carrier by means of said ball and socket joint. This mounting of the suspension arm enlarges the lateral expansion of the steering knuckle carrier, that is, the expansion thereof along its transverse axis that extends approximately in travel direction. Thereby the maximum wheel lock is not limited by the suspension arm mounting. The suspension arm can thus be mounted outwardly as far as possible. Thereby better axle kinematics is obtained. Unlike a pivot bearing joint, the ball and socket joint has three degrees of freedom. However, only one degree of freedom of the rotation of the ball is needed to engage the vehicle. The other possibilities of rotation must, therefore, be eliminated. The pitching motion, that is, a torsion of the steering knuckle carrier around the vehicle axis is prevented by a sufficient spacing between the fastening points of the upper and lower suspension arms. A twisting of the steering knuckle carrier around the vertical axis of the vehicle would cause an imprecision of the steering, that is, steering angle, the wheels must accurately turn around the vertical axis of the vehicle on the steering knuckle pin which constitutes the connection between steering knuckle carrier and wheel hub. Such torsion is eliminated by the upper suspension arm being connected by a pair of tapered roller bearings with the steering knuckle carrier. The supporting base of the tapered roller bearings is wide enough for said bearings to alone absorb the torque of the steering knuckle carrier around the vertical axis of the vehicle. The steering knuckle carrier must here have a sufficient resistance to torsion.

The ball of the ball and socket joint preferably sits in a plain bearing race. The ball and socket joint is advantageously connected with the steering knuckle carrier by a pin which has a conical section and a threaded section and which meshes in a bore in the steering knuckle carrier having a tapered seat. The tapered seat ensures the exact positioning of the ball and socket joint. The pin is advantageously retained in the steering knuckle carrier by a locknut. The locknut is desirably housed in a counterbore in the steering knuckle carrier so as not to project therefrom and is thereby protected. The steering knuckle carrier thus has a throughhole that is conical at its lower end and continues as stepped cylinder. The step is the stop surface for the locknut.

The lower suspension arms is preferably placed outwardly relatively farther to the vehicle width than the upper. The axis kinematics are thus improved.

The lower and upper suspension arms are preferably designed as triangular guide rods.

BRIEF DESCRIPTION OF THE DRAWING

An embodiment of the invention is shown in FIG. 1; and

FIG. 2 is a partial diagrammatic view of the tapered roller bearing along section line 2—2 of FIG. 1 which is an elevational view.

DESCRIPTION OF THE PREFERRED EMBODIMENT

A steering knuckle with a wheel hub 1 is mounted via a steering knuckle pin on a steering knuckle carrier 2. The steering knuckle carrier 2 is connected on its underside with a suspension arm 4 by a ball and socket joint 3. The ball of the ball and socket joint 3 preferably sits in a plain bearing race 12. The ball and socket joint 3 is advantageously connected with the steering knuckle carrier 2 by a pin 10 which has a conical section and a threaded section and which meshes in a bore in the steering knuckle carrier having a tapered seat 13. Said suspension arm is fastened by a pivot bearing 5 on the vehicle frame 6. A second suspension arm 7 placed above the first suspension arm 4 connects, by means of a pair of tapered roller bearings 8, the upper part of the steering knuckle carrier 2 to the vehicle frame 6 through a pivot bearing 9. The ball and socket joint 3 is fastened to the steering knuckle carrier 2 by a pin 10 and a locknut 11.

LIST OF REFERENCE NUMERALS 1 steering knuckle with wheel hub
2 steering knuckle carrier
3 ball and socket joint
4 suspension arm
5 pivot bearing
6 vehicle frame
7 suspension arm
8 pair of tapered roller bearings
9 pivot bearing
10 pin
11 locknut

What is claimed is:

1. A suspension for a single wheel of a motor vehicle comprising:

a steering knuckle carrier (2) having a steering knuckle rotatably supporting a wheel hub (1);

a lower suspension arm (4) connected by a ball and socket joint (3) to a lower region of the steering knuckle carrier (2);

an upper suspension arm (7) is connected to an upper region of the steering knuckle carrier (2) by a bearing (8);

wherein any torque, tending to affect the steering knuckle carrier, is translated by the bearing (8) into motion about an axis extending in a travel direction of the vehicle, and the bearing (8), connecting the upper suspension arm (7) with the steering knuckle carrier (2), comprises a pair of tapered roller bearings (8) each having a tapered base to resist the torque affecting the steering knuckle carrier (2) around a vertical axis perpendicular to the axis extending in a travel direction of the vehicle.

2. The suspension according to claim 1, wherein the lower suspension arm (4) is connected via the ball and socket joint to an underside surface of the steering knuckle carrier (2).

3. The suspension according to claim 2, wherein the ball of the ball and socket joint (3) is connected with the steering knuckle carrier (2) by a pin (10) having an elongate conical section threadably engaged with an elongate conical bore in the underside portion of the steering knuckle carrier (2).

4. The suspension according to claim 3, wherein the pin (10) is retained in the elongate conical bore of the steering knuckle carrier (2) by a locknut (11).

5. The suspension according to claim 1, wherein the socket of the ball and socket joint (3) comprises a bearing race rotatably encompassing at least a portion of the ball.

6. The suspension according to claim 1, wherein the ball of the ball and socket joint (3), defines a vertical axis which extends perpendicular to the axis extending in a travel direction of the vehicle.

7. A suspension for a single wheel of a motor vehicle comprising:

a steering knuckle carrier (2) having a steering knuckle rotatably supporting a wheel hub (1);

a lower suspension arm (4) connected by a ball and socket joint (3) to a lower region of the steering knuckle carrier (2); and an upper suspension arm (7) is connected to an upper region of the steering knuckle carrier (2) by a bearing (8);

wherein any torque, tending to affect the steering knuckle carrier, is translated by the bearing (8) into motion about the longitudinal bearing axis, and the bearing, which connects the upper suspension arm (7) with the steering knuckle carrier (2), comprises a pair of tapered roller bearings (8) which each have a sufficiently tapered base to resist the torque affecting the steering knuckle carrier (2) around a vertical axis perpendicular to the longitudinal bearing axis.

8. A suspension for a single wheel of a motor vehicle comprising:

a steering knuckle carrier (2) having a steering knuckle rotatably supporting a wheel hub (1);

a lower suspension arm (4) connected by a ball and socket joint (3) to a lower region of the steering knuckle carrier (2); and an upper suspension arm (7) is connected to an upper region of the steering knuckle carrier (2) by a bearing (8);

wherein any torque, tending to affect the steering knuckle carrier, is translated by the bearing (8) into rotational motion only about the longitudinal bearing axis, the bearing, that connect the upper suspension arm (7) with the steering knuckle carrier (2), comprises a pair of tapered roller bearings (8) which each have a sufficiently tapered base to resist the torque, affecting the steering knuckle carrier (2), and only permit movement about the longitudinal bearing axis; and the ball of the ball and socket joint (3), defines a vertical axis which extends perpendicular to the longitudinal bearing axis and the vehicle longitudinal axis.

* * * * *